W. H. COVEL, Dec'd.
J. AUSTIN, Assignee of E. H. COVEL, Adm'r.
AUTOMATIC FEED AND ABSORPTION CARBURETER.
No. 6,754. Reissued Nov. 23, 1875.
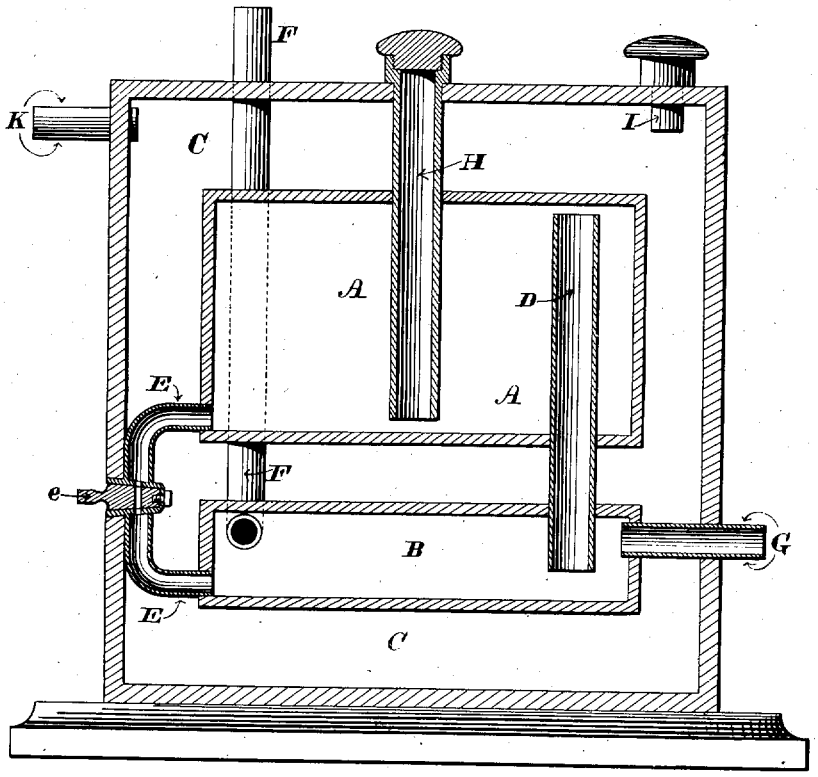
WITNESSES:
Jas. E. Hutchinson
S. M. Pool
J. Austin
Assignee of W. H. Covel dec'd.
Per E. H. Covel, adm'r,
attorney

UNITED STATES PATENT OFFICE.

JONATHAN AUSTIN, OF NEW YORK, N. Y., ASSIGNEE OF E. HALL COVEL, ADMINISTRATOR OF WILLIAM H. COVEL, DECEASED.

IMPROVEMENT IN AUTOMATIC FEED AND ABSORPTION CARBURETERS.

Specification forming part of Letters Patent No. 91,213, dated June 15, 1869; reissue No. 6,754, dated November 23, 1875; application filed November 13, 1875.

*To all whom it may concern:*

Be it known that WILLIAM H. COVEL, of the city of Brooklyn, in the county of Kings and State of New York, deceased, did invent a new and useful Improvement in Gas-Carbureters, which improvement is fully set forth in the following specification, reference being had to the accompanying drawings.

The nature of this invention consists in the construction and arrangement of a water-tight jacket or chamber, within which is secured a reservoir or tank containing the hydrocarbon fluid, and located above, and connected with the carbureting-chamber by an automatic feed-pipe in gas-carbureters, and then causing a supply of cold water to fill said water-tight jacket or chamber, and thereby pass around each and every part of said reservoir, tank, and chamber, with their several connecting-pipes, so as to retain, equalize, or restore the latent heat lost by evaporation to about the temperature of the water thus employed.

The following description will enable a person skilled in the art to manufacture and use the apparatus.

A represents a tank or chamber containing the hydrocarbon fluid; B, the inclosed or vaporizing chamber, in which the air or gas is brought into contact with the carbureting fluid; C, an outer case or water-jacket; D, a pipe leading from near the top of tank A to near the bottom of the vaporizing-chamber; E, a pipe leading from near the bottom of vaporizing-chamber B, and having at any convenient point a device by which said pipe E may be effectually closed when desired. F is the inlet-pipe, through which the gas or air from the gas-meter or the main enters the vaporizing-chamber B. G is the gas-outlet pipe leading from the carbureting-chamber B to the regulator or pipes in the building. H is the pipe through which the hydrocarbon fluid is admitted into tank A, and extends to a point near the bottom of tank A. I is an ordinary water-pipe, closed with a cock, plug, or other suitable device at any desirable point. K is a water-outlet.

The operation of the invention is as follows: The apparatus is first placed in its desired position in the cellar, or any other locality, but always locating it between the common gas-meter and the gas-lights in the building. The necessary connections and joints with the pipes are then made, and the joints ascertained to be absolutely gas-tight. The cock or other device in pipe E is then closed, so as to prevent any flow of hydrocarbon fluid into tank B while tank A is being filled with the carbureting fluid.

In filling tank A care should be taken not to overflow pipe D; consequently a space is left in the upper part of tank A to about one-eighth of the capacity of the tank, and the surface of the fluid left below the upper end of pipe D.

The jacket or outer case C is then filled with cold water to such an extent and in such a manner as to render gas-tight and water-sealed all the inlets and outlets to tank A. This is deemed important, as it secures the safety of the apparatus from the danger of fire from leakage, as well as insures its successful working. Should there be a leak in any of the inlets or outlets of tank A, two bad effects would follow: first, the vacuum would be broken, and the successful automatic feed would become inoperative; and, second, vapor from the naphtha used in chamber A would escape into the room or place where the carbureter was located, and endanger the building from fire from leakage. Tank A, therefore, is secured from leakage by water-sealing all the inlets to said tank, and by ground cocks, plugs, caps, and other devices, beyond all peradventure of any escape of vapor out of, or any admission of air into, tank A while the apparatus is in operation.

It will be borne in mind that the fluid hydrocarbon used in these machines for carbureting gas is generally naphtha, a (light volatile product from petroleum,) and precautions against accident by fire caused by leakage should be provided in the manner above set forth.

A brief explanation will show why this apparatus is safe from the dangerous effects of the escape of the vapor of this light volatile fluid if there should be a leak in any part of the apparatus. Prompt notice that a leak has taken place in the machine is very important.

Should a leak occur in tank A, where this light fluid is stored, the water from jacket C will rush into tank A, and flood that tank, stop the flow of gas, and put out the lights in the building, and promptly notify the parties having charge that a leak has taken placed, and that the machine should be removed at once and repaired. So, in like manner, if a leak occurs in tank B, this chamber is flooded with water and the entire machine becomes inoperative, and the lights are extinguished, thus giving prompt notice to all of the cause of the derangement of the carbureter. Then, again, if a leak should take place in the outside case or water-jacket C, all would be notified by the leakage of water that the machine should be removed and replaced by a safe one. It is the timely notice thus given that enables all to protect themselves against danger from fire in the use of this apparatus. But there is still another important effect produced by the use of an automatic feed and a water-jacket combined, viz: It is well known that in order to make a satisfactory light by an addition of a certain quantity of the vapor of hydrocarbon to the common gas, as usually manufactured, it is very important that this additional quantity of carbon should be absorbed by the gas with as much uniformity as to quantity as possible.

Too much carbon may make a smoky light, too little not light enough. To effect this uniformity the entire tanks A and B are submerged in a body of cold water, so that the surrounding atmosphere may not affect the fluid inclosed within tanks A and B to any great extent. It is frequently convenient and desirable to place these apparatus in the neighborhood of furnaces, and near steam-pipes, and in rooms and cellars where the temperature is too high to evaporate the fluid naphtha in an economical and uniform manner. This fluid is exceedingly sensitive to heat, and hence the fluid should be kept at as low a temperature as is consistent with a moderate, uniform, and constant development of the vapor, and its proper absorption by the gas as it passes over the surface of the fluid hydrocarbon. The water-jacket effects this object in a most satisfactory manner. The water is kept from getting warm in the jacket, and this tendency is held in check by the amount of refrigeration produced in tank B, caused by the evaporation of the fluid hydrocarbon, and communicated to the surrounding water, giving out to the water more or less of refrigeration, as more or less gas is consumed, or more or less evaporation takes place. The effect thus produced tends to impart to the gas a uniform supply of additional carbon-vapor with much regularity and constancy, which would not be the case if the water-jacket was not employed.

It is found important that tank A should be entirely surrounded with water, or at least top and sides of it; that the temperature of the fluid in that tank should be as uniformly low as possible; that the tendency of the fluid to rise in temperature in a warm place should be held in check by this means, and not be delivered to tank B but at about the same temperature as, or a little higher temperature than, the fluid in tank B, which is delivered to that tank in small, fresh, and unrefrigerated quantities, and of a nearly uniform gravity.

If there be any heavy-gravity fluid in tank A it will be delivered to tank B and be absorbed by the gas first, while the lighter portions of the fluid will remain in the tank A, and be delivered to tank B, and be absorbed by the gas at the last of the charge.

Now, it is obvious that any mode of feeding the fluid from tank A in regular and uniform quantities, and at proper intervals, down into tank B other than the one here set forth will answer the purpose, the chief, and indeed the only object being to deliver the hydrocarbon fluid into the vaporizing-chamber B in small quantities, fresh and unrefrigerated, and of nearly an equalized or uniform gravity at all times when the machine is in action, and keeping it in that condition and protecting it from the outside atmosphere by the cooling effects of the water in jacket C, which, with the refrigeration produced in tank B, and communicated to the water surrounding that chamber, will maintain that uniformity of temperature in the fluid hydrocarbon so desirable in the business of carbureting air or coal-gas.

In order to render the above-described machine still further safe from fire and preserve its constant automatic action it has been found desirable not only to make the tank A, which holds the hydrocarbon fluid, of brass or copper, but the entire machine of one or the other of those metals. By so doing much better seams can be made than by any other metal, and leaks almost entirely prevented. I make this apparatus of either brass or copper in order to secure safety as far as possible, and I give great attention to the seams, that they may be absolutely tight. In a machine of this kind it is found almost indispensable that there should be no moving parts, from the fact of the difficulty of keeping them in order.

It will be seen from the above description that the difficulty arising from that source is almost entirely obviated.

The above-described process and apparatus is known in the trade and by the fire underwriters of the United States as the automatic feed and absorption process, and is called the "Standard Carbureter."

Having thus described the construction and operation of this invention, what I claim, and desire to secure by Letters Patent, is—

1. In gas-carbureters, an automatic feed between the chambers A and B, said chambers being surrounded on all sides by water contained within a water jacket or case, for the purposes set forth.

2. In gas-carbureters, the chambers A and

B, connected together by means of the pipe E, in which pipe is contained a closing device, *e*, combined with the pipes D, F, G, and H, the whole being surrounded by the case or jacket C, filled with water, said case or jacket having its supply-opening I, the whole constructed, arranged, and combined in the manner and for the purpose herein described.

3. The within-described method of controlling the temperature and latent heat of the carbureting fluid, which consists in surrounding the hydrocarbon-fluid tank A and carbureter on all sides with water, substantially as specified.

4. The hydrocarbon-fluid chamber A and vaporizing-chamber B, entirely surrounded by water, and provided with inlet and outlet pipes, having all their joints, cocks, and plugs water-sealed, in combination with a water-tight case or jacket, C, in the manner and for the purpose herein described.

JONA. AUSTIN,

*Assignee.*

Witnesses:

W. I. LUDLOW,

S. S. NORTON.